(12) United States Patent
Sumi et al.

(10) Patent No.: US 11,654,510 B2
(45) Date of Patent: May 23, 2023

(54) ADDITIVE MANUFACTURING APPARATUS

(71) Applicant: Mitsubishi Electric Corporation, Tokyo (JP)

(72) Inventors: Nobuyuki Sumi, Tokyo (JP); Shun Kayashima, Tokyo (JP); Satoshi Hattori, Tokyo (JP); Seiji Uozumi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/640,831

(22) PCT Filed: Oct. 25, 2019

(86) PCT No.: PCT/JP2019/041965
§ 371 (c)(1),
(2) Date: Mar. 7, 2022

(87) PCT Pub. No.: WO2021/079499
PCT Pub. Date: Apr. 29, 2021

(65) Prior Publication Data
US 2022/0266378 A1    Aug. 25, 2022

(51) Int. Cl.
*B23K 26/03*    (2006.01)
*B23K 26/21*    (2014.01)

(52) U.S. Cl.
CPC .............. *B23K 26/03* (2013.01); *B23K 26/21* (2015.10)

(58) Field of Classification Search
CPC ................................ B23K 26/21; B23K 26/03
USPC ........................ 219/121.83, 130.51
See application file for complete search history.

(56) References Cited

U.S. PATENT DOCUMENTS

| | | | | |
|---|---|---|---|---|
| 3,683,149 A | * | 8/1972 | Mages | B23K 9/092 219/137 R |
| 4,954,691 A | * | 9/1990 | Parks | B41M 7/00 219/130.21 |
| 5,281,791 A | * | 1/1994 | Tabata | B23K 9/092 219/130.33 |
| 5,349,156 A | * | 9/1994 | Madigan | B23K 9/1062 219/130.21 |

(Continued)

FOREIGN PATENT DOCUMENTS

JP    7-232271 A    9/1995
JP    11-10338 A    1/1999

(Continued)

OTHER PUBLICATIONS

International Search Report and Written Opinion dated Dec. 3, 2019, received for PCT Application PCT/JP2019/041965, Filed on Oct. 25, 2019, 11 pages including English Translation.

(Continued)

*Primary Examiner* — Jimmy Chou
(74) *Attorney, Agent, or Firm* — Patrick L. Miller

(57) ABSTRACT

An NC device that is a numerical control device controls an additive manufacturing apparatus. The additive manufacturing apparatus performs modeling by application of a melted material. The NC device includes a monitoring unit that monitors occurrence of a drop caused by a material after being melted remaining on the material before being melted, and a command generating unit that generates commands for causing the additive manufacturing apparatus to remove the drop that has occurred.

12 Claims, 14 Drawing Sheets

(56) References Cited

U.S. PATENT DOCUMENTS

| | | | | |
|---|---|---|---|---|
| 5,834,732 | A * | 11/1998 | Innami | B23K 9/091 219/130.51 |
| 6,008,470 | A * | 12/1999 | Zhang | B23K 9/092 219/130.51 |
| 6,025,573 | A * | 2/2000 | Stava | B23K 9/092 219/130.21 |
| 7,304,269 | B2 * | 12/2007 | Fulmer | B23K 9/0738 219/130.21 |
| 8,203,099 | B2 * | 6/2012 | Peters | B23K 9/0738 219/130.21 |
| 8,809,737 | B2 * | 8/2014 | Aberg | B23K 9/093 219/130.51 |
| 9,393,635 | B2 * | 7/2016 | Peters | B23K 9/09 |
| 9,415,458 | B2 * | 8/2016 | Doyle | B23K 9/092 |
| 9,821,399 | B1 | 11/2017 | Vigdal et al. | |
| 9,895,760 | B2 * | 2/2018 | Peters | B23K 9/092 |
| 2007/0210048 | A1 * | 9/2007 | Koshiishi | B23K 9/095 219/130.51 |
| 2007/0221642 | A1 * | 9/2007 | Era | B23K 9/093 219/130.21 |
| 2008/0223840 | A1 * | 9/2008 | Era | B23K 9/092 219/130.21 |
| 2008/0237196 | A1 * | 10/2008 | Yamazaki | B23K 9/173 219/74 |
| 2008/0264923 | A1 * | 10/2008 | White | B23K 9/173 323/212 |
| 2009/0242533 | A1 * | 10/2009 | Yamazaki | B23K 9/0956 219/130.32 |
| 2010/0200553 | A1 * | 8/2010 | Yamazaki | B23K 9/0956 219/136 |
| 2014/0131320 | A1 * | 5/2014 | Hearn | B23K 9/173 219/74 |
| 2015/0209889 | A1 * | 7/2015 | Peters | B23K 9/124 219/76.14 |
| 2015/0209905 | A1 * | 7/2015 | Matthews | B23K 9/173 219/76.14 |
| 2015/0209907 | A1 * | 7/2015 | Narayanan | B23K 9/173 219/76.14 |
| 2015/0209908 | A1 * | 7/2015 | Peters | B23K 26/34 219/76.14 |

FOREIGN PATENT DOCUMENTS

| | | |
|---|---|---|
| JP | 2001-179471 A | 7/2001 |
| JP | 2001-321942 A | 11/2001 |
| JP | 2008-68283 A | 3/2008 |
| JP | 2010-75979 A | 4/2010 |
| JP | 5186726 B2 | 4/2013 |
| JP | 2016-150384 A | 8/2016 |
| JP | 2017-148841 A | 8/2017 |
| JP | 2019-523135 A | 8/2019 |

OTHER PUBLICATIONS

Notice of Reasons for Refusal dated May 19, 2020, received for Japanese Application 2020-506279, 10 pages including English Translation.

Notice of Reasons for Refusal dated Oct. 6, 2020, received for Japanese Application 2020-506279, 10 pages including English Translation.

Decision to Grant a Patent dated Jan. 5, 2021, received for Japanese Application 2020-506279, 5 pages including English Translation.

* cited by examiner

FIG.4
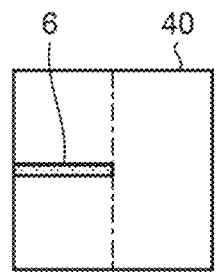
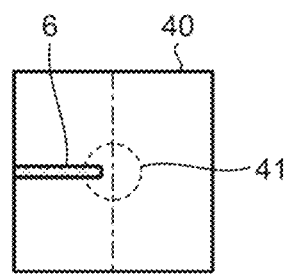

FIG.6
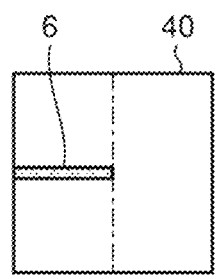
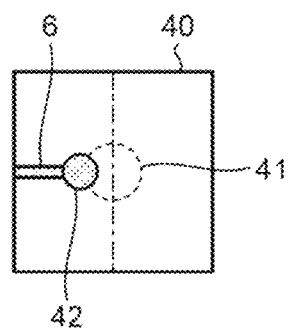

FIG.8
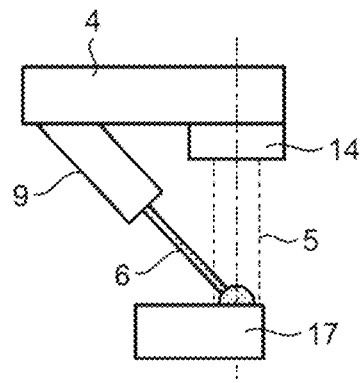
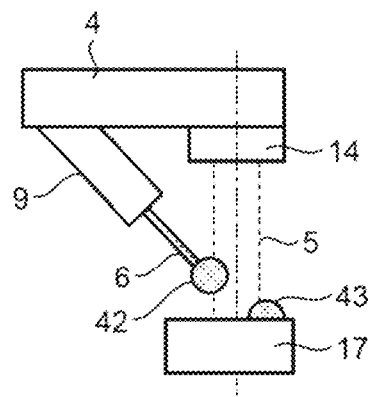
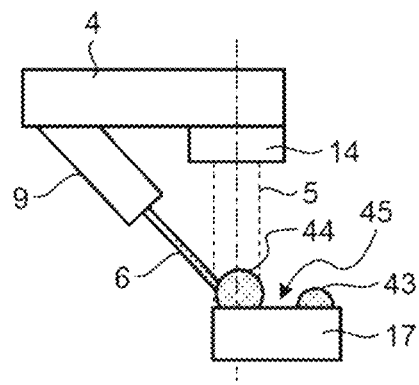

ADDITIVE MANUFACTURING APPARATUS

CROSS-REFERENCE TO RELATED APPLICATION

The present application is based on PCT filing PCT/JP2019/041965, filed Oct. 25, 2019, the entire contents of which are incorporated herein by reference.

FIELD

The present invention relates to a numerical control device for controlling an additive manufacturing apparatus, an additive manufacturing apparatus for performing modeling by application of a melted material, and a method for controlling an additive manufacturing apparatus.

BACKGROUND

Additive manufacturing apparatuses for manufacturing solid shapes by the direct energy deposition (DED) technology are known. Some additive manufacturing apparatuses perform modeling by locally melting a wire, which is a material, and applying the melted material. Such an additive manufacturing apparatus performs modeling by feeding a wire to an irradiation region of a beam emitted from the machining head, so that a melted material comes in contact with a workpiece.

In an additive manufacturing apparatus using a wire, as a result of the wire being melted at a position away from a workpiece, a phenomenon of a material after being melted remaining at a leading end of the wire before being melted may occur. Such a phenomenon causes a drop, which is a lump of material after being melted, at the leading end of the wire. In this case, because the material remains on the wire, modeling may be continued without application of the material to the position to which the material should have been applied. In addition, in a case where modeling is continued after occurrence of a drop, the drop may be applied with a melted material to a workpiece, and thus results in application of an excessive amount of material to the workpiece. Furthermore, a drop may fall at an unintended position. Such problems in the case where the phenomenon of a material after being melted remaining on the material before being melted has occurred lowers the product shape accuracy.

In related art, in order to reduce such problems, a user of an additive manufacturing apparatus monitors occurrence of a drop, and when a drop has occurred, the user needs to interrupt modeling and conduct work for removing the drop. In this case, because the burden on the user is high and occurrence of a drop may be overlooked, it is difficult to reduce problems caused by the phenomenon of a material after being melted remaining on the material before being melted.

Patent Literature 1 discloses a welding system that determines whether or not a defect of incomplete fusion is present in welding. The welding system described in Patent Literature 1 images a molten pool formed on a workpiece, and determines whether or not a defect is present on the basis of the shape of the molten pool.

CITATION LIST

Patent Literature

Patent Literature 1: Japanese Patent Application Laid-open No. 2017-148841

SUMMARY

Technical Problem

Even when a shape of the molten pool is detected as described in Patent Literature 1, however, a drop that occurs in modeling performed by an additive manufacturing apparatus cannot be detected. Thus, the technology described in Patent Literature 1 is disadvantageous in that problems caused by the phenomenon of a material after being melted remaining on the material before being melted cannot be reduced.

The present invention has been made in view of the above, and an object thereof is to provide a numerical control device capable of reducing problems caused by the phenomenon of a material after being melted remaining on the material before being melted.

Solution to Problem

In order to solve the above problem and achieve the object, a numerical control device for controlling an additive manufacturing apparatus that performs modeling by application of a melted material, the numerical control device includes: a monitoring unit to monitor occurrence of a drop caused by a material after being melted remaining on the material before being melted; and a command generating unit to generate a command for causing the additive manufacturing apparatus to remove the drop that has occurred.

Advantageous Effects of Invention

A numerical control device according to the present invention produces an effect of enabling reduction in problems caused by the phenomenon of a material after being melted remaining on the material before being melted.

BRIEF DESCRIPTION OF DRAWINGS

FIG. 4 is a diagram illustrating an example of images obtained by imaging the states of modeling illustrated in FIG. 3.

FIG. 6 is a diagram illustrating an example of images obtained by imaging the states of modeling illustrated in FIG. 5.

FIG. 8 is a diagram illustrating states in which modeling is continued by the additive manufacturing apparatus according to the first embodiment with a drop having occurred.

DESCRIPTION OF EMBODIMENTS

A numerical control device, an additive manufacturing apparatus, and a method for controlling the additive manufacturing apparatus according to certain embodiments of the present invention will be described in detail below with reference to the drawings. Note that the present invention is not limited to the embodiments. In the description below, the numerical control device may be referred to as a numerical control (NC) device.

First Embodiment

Figure 1:
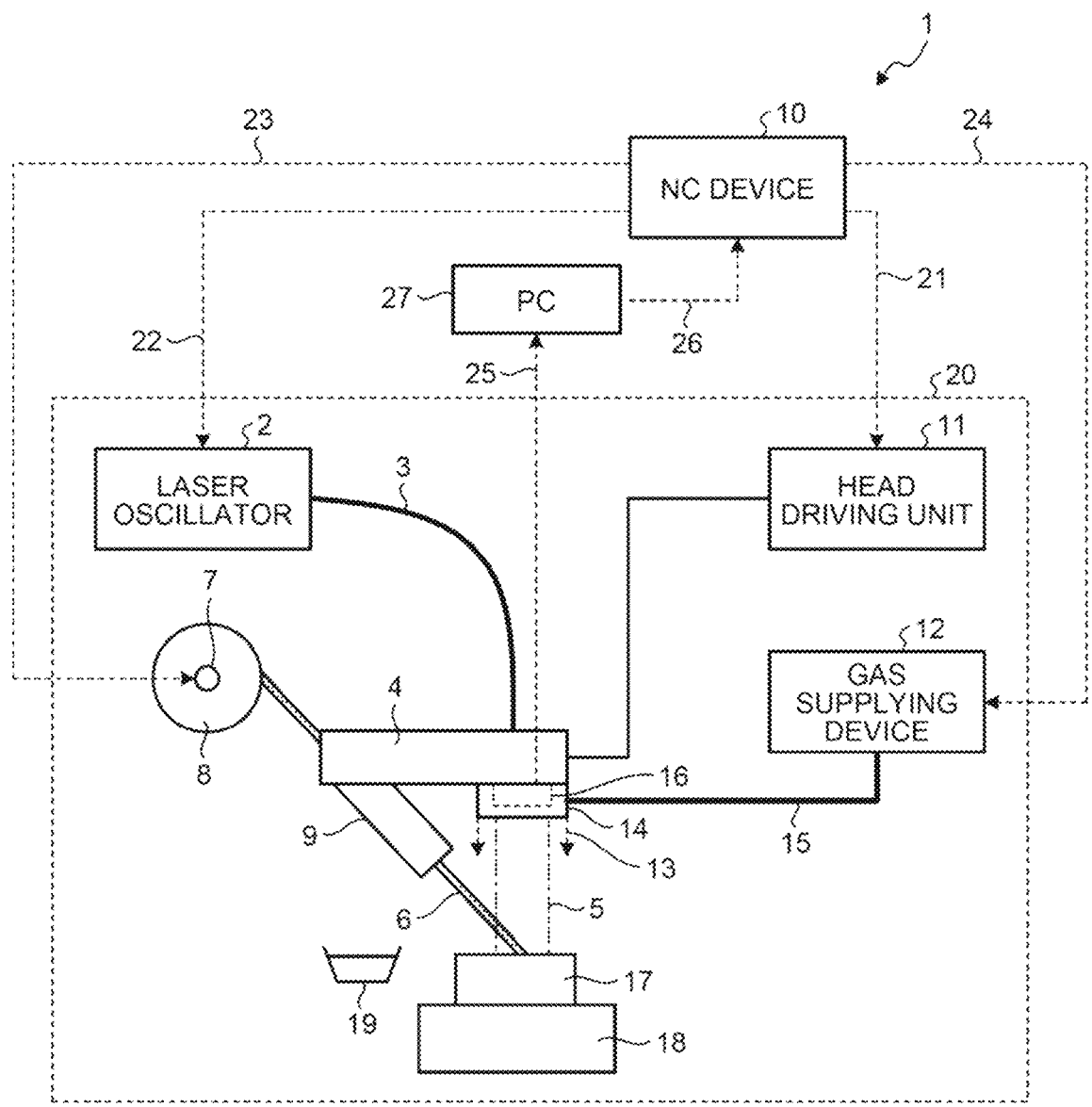
FIG. 1 is a diagram illustrating a schematic configuration of an additive manufacturing apparatus according to a first embodiment of the present invention.

FIG. 1 is a diagram illustrating a schematic configuration of an additive manufacturing apparatus according to a first embodiment of the present invention. An additive manufacturing apparatus 1 is a machine tool for modelling by application of a melted material. The additive manufacturing apparatus 1 locally melts a wire 6, which is a material, by a beam 5. The additive manufacturing apparatus 1 manufactures solid shapes by stacking beads, which are solidified products of the material after being melted, on a base material. In the first embodiment, the beam 5 is a laser beam. A workpiece 17 refers to an object to which a melted material is added, that is, the base material and the beads. The workpiece 17 is placed on a stage 18.

The additive manufacturing apparatus 1 includes a laser oscillator 2, which is a beam source. The laser oscillator 2 emits the beam 5 with which the workpiece 17 is irradiated. The beam 5 propagates to a machining head 4 via a fiber cable 3, which is an optical transmission path. The machining head 4 includes a beam nozzle 14 for emitting the beam 5 toward the workpiece 17.

The wire 6 is wound around a wire spool 8, which is a supply source of the wire 6. A rotary motor 7 is a driving source for rotating the wire spool 8. The wire 6 is fed from the wire spool 8 by being driven by the rotary motor 7. The wire 6 fed from the wire spool 8 passes through a wire nozzle 9 on the machining head 4, and is fed to an irradiation position of the beam 5.

The additive manufacturing apparatus 1 includes a gas supplying device 12 for supplying gas 13. The gas 13 flows from the gas supplying device 12 to a gas nozzle via piping 15. The beam nozzle 14 and the gas nozzle are arranged coaxially. The gas nozzle emits a jet of gas 13 toward the workpiece 17. The gas nozzle is not illustrated. The additive manufacturing apparatus 1 inhibits oxidation of the beads and cools the beads by emitting a jet of gas 13. Alternatively, the beam nozzle 14 and the gas nozzle need not be arranged coaxially.

The additive manufacturing apparatus 1 includes a head driving unit 11 for moving the machining head 4. The head driving unit 11 is an operation mechanism for translational movement in each of the directions of three axes. The head driving unit 11 moves the irradiation position of the beam 5 and the position to which the wire 6 is fed by moving the machining head 4. The additive manufacturing apparatus 1 only needs to be able to move the machining head 4 relative to the workpiece 17. The additive manufacturing apparatus 1 may move the irradiation position of the beam 5 and the position to which the wire 6 is fed by moving the stage 18 relative to the machining head 4.

The additive manufacturing apparatus 1 includes a camera 16 for imaging the workpiece 17. The camera 16 functions as a detecting unit for monitoring occurrence of a drop. The beam nozzle 14 and the camera 16 are arranged coaxially. In FIG. 1, the camera 16 located inside the beam nozzle 14 is indicated by a broken line. The camera 16 outputs image data 25 obtained by imaging the workpiece 17 to a personal computer (PC) 27. The camera 16 may be used for monitoring the state of modeling. A container 19 for collecting drops cut from the wire 6 before being melted is disposed around the stage 18.

The additive manufacturing apparatus 1 includes an NC device 10 for controlling the entire additive manufacturing apparatus 1. The NC device 10 controls the head driving unit 11 by outputting an axis command 21 to the head driving unit 11. The NC device 10 controls the laser oscillator 2 by outputting a laser output command 22 to the laser oscillator 2. The NC device 10 controls the rotary motor 7 by outputting a feed command 23 to the rotary motor 7. The NC device 10 controls the gas supplying device 12 by outputting a gas supply command 24 to the gas supplying device 12.

The components of the additive manufacturing apparatus 1 illustrated in FIG. 1 other than the NC device 10 and the PC 27 constitute a modeling unit 20. The modeling unit 20 performs modeling by application of a melted material. The modeling unit 20 also performs recovery operation including an operation for removing a drop when the drop is detected. The recovery operation will be described later.

The PC 27 is an information processing device for measuring the dimension of a material after being melted remaining at the wire 6 or the like by analyzing the image data 25 input to the PC 27. The measurement performed by the PC 27 will be described later. The PC 27 outputs a measured value 26 obtained by the measurement to the NC device 10. Note that the analysis of the image data 25 is not limited to be performed by the information processing device included in the additive manufacturing apparatus 1, and may be performed by an information processing device external to the additive manufacturing apparatus 1.

In the additive manufacturing apparatus 1 illustrated in FIG. 1, the direction in which the wire 6 is fed is a direction at an angle to the direction in which the beam 5 is emitted from the machining head 4. The direction in which the wire 6 is fed may be the same as the direction in which the beam 5 is emitted. The beam 5 may be a beam other than a laser beam. The beam 5 may be an electron beam. The additive manufacturing apparatus 1 may perform modeling by generating an arc between the wire 6 and the workpiece 17.

Figure 2:
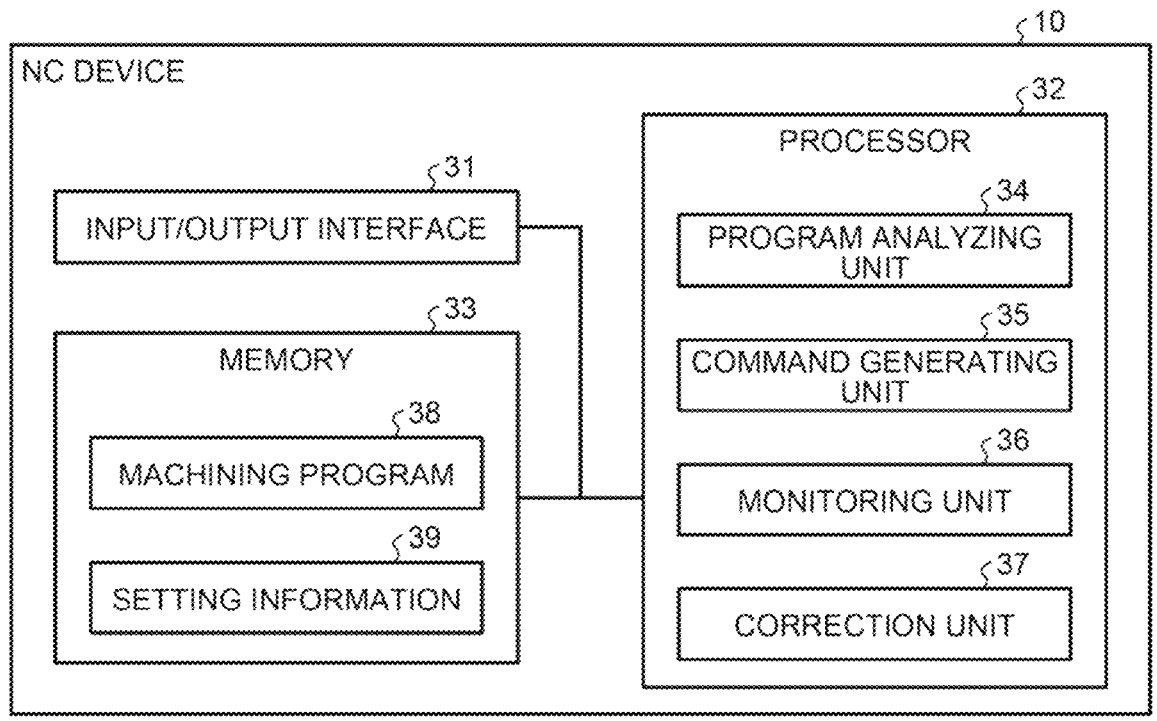
FIG. 2 is a diagram illustrating a configuration of a numerical control device of the additive manufacturing apparatus according to the first embodiment.

FIG. 2 is a diagram illustrating a configuration of the numerical control device of the additive manufacturing apparatus according to the first embodiment. The NC device 10 includes an input/output interface 31, which is a connection interface with a device external to the NC device 10, a processor 32 for performing various processes, and a memory 33 for storing information.

The measured value 26 is input to the input/output interface 31. The input/output interface 31 outputs the axis command 21 to the head driving unit 11. The input/output interface 31 outputs the laser output command 22 to the laser oscillator 2. The input/output interface 31 outputs the feed command 23 to the rotary motor 7. The input/output interface 31 outputs the gas supply command 24 to the gas supplying device 12.

The processor 32 is a central processing unit (CPU). The processor 32 may be: a processing device, a computing device, a microprocessor, a microcomputer, or a digital signal processor (DSP). Examples of the memory 33 include a random access memory (RAM), a read only memory (ROM), a flash memory, an erasable programmable read only memory (EPROM), and an electrically erasable programmable read only memory (EEPROM: registered trademark). Examples of the memory 33 also include a hard disk drive (HDD) and solid state drive (SSD).

A machining program 38 is input to the input/output interface 31. The memory 33 stores the machining program 38 input to the input/output interface 31. The machining program 36 is a numerical control program created by a computer aided manufacturing (CAM) device.

A program analyzing unit 34, a command generating unit 35, a monitoring unit 36, and a correction unit 37 are functional units implemented with use of the processor 32. The functions of the program analyzing unit 34, the command generating unit 35, the monitoring unit 36, and the correction unit 37 are implemented by combination of the processor 32 and software. The functions of the program analyzing unit 34, the command generating unit 35, the monitoring unit 36, and the correction unit 37 may be implemented by combination of the processor 32 and firmware or combination of the processor 32, software, and firmware. The software or firmware is described in the form of programs and stored in the memory 33. The processor 32 reads the software or the firmware. The processor 32 executes the software or the firmware.

The program analyzing unit 34 analyzes the machining program 33. The program analyzing unit 34 analyzes a movement path on the basis of the contents of processes described in the machining program 38. The movement path is a path on which the position to which the wire 6 is fed is moved. The program analyzing unit 34 outputs data about the analyzed movement path to the command generating unit 35. The program analyzing unit 34 obtains information for setting a machining condition from the machining program 38, and sets the machining condition. The memory 33 stores setting information 39, which is information on the set machining condition. The command generating unit 35 reads the setting information 39 stored in the memory 33.

The command generating unit 35 generates commands including the axis command 21, the laser output command 22, the feed command 23, and the gas supply command 24. The command generating unit 35 generates first commands, which are commands in accordance with the machining program 33 and the setting information 39. The command generating unit 35 also generates second commands, which are commands for causing the additive manufacturing apparatus 1 to perform the recovery operation.

The monitoring unit 36 monitors occurrence of a drop. The monitoring unit 36 determines whether or not a drop has occurred on the basis of the measured value 26 input to the input/output interface 31. The monitoring unit 36 outputs the determination result to the command generating unit 35. In response to a determination result indicating that a drop has occurred, the command generating unit 35 interrupts generation of commands for modeling, and generates commands for the recovery operation. The correction unit 37 corrects the machining condition when a drop has occurred.

Figure 3:
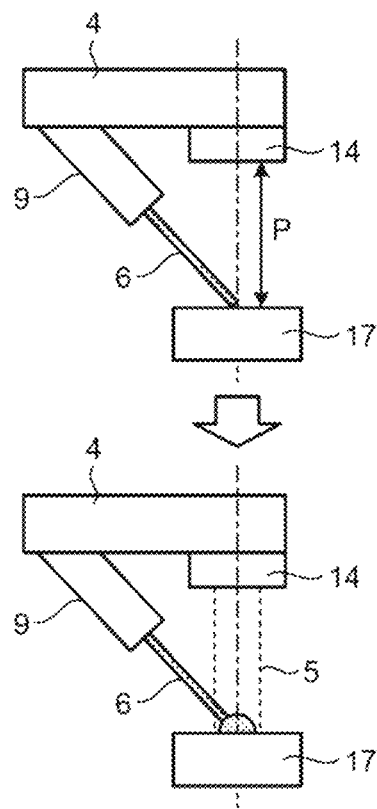
FIG. 3 is a diagram illustrating states of modeling performed by the additive manufacturing apparatus according to the first embodiment.

FIG. 3 is a diagram illustrating states of modeling performed by the additive manufacturing apparatus according to the first embodiment. FIG. 4 is a diagram illustrating an example of images obtained by imaging the states of modeling illustrated in FIG. 3. In the first embodiment, the additive manufacturing apparatus 1 performs feeding of the wire 6 and irradiation with the beam 5 in a state in which the machining head 4 is stopped, and moves the machining head 4 in a state in which feeding of the wire 6 and irradiation with the beam 5 are stopped. Such modeling will also be referred as dot forming in the description below. FIGS. 3 and 4 illustrate states of dot forming when no drop has occurred.

In FIG. 3, a pitch P is the distance between the workpiece 17 and the beam nozzle 14. FIG. 3 illustrates a state before irradiation with the beam 5 is started with the pitch P being an appropriate length, and a state in which the workpiece 17 is irradiated with the beam 5 with the pitch P still being an appropriate length. In FIG. 3, the machining head 4, the wire 6 fed from the wire nozzle 9 to the workpiece 17, and the workpiece 17 are illustrated. FIG. 4 illustrates images 40 imaged by the camera 16. FIG. 4 illustrates an image 40 imaged before irradiation with the beam 5 is started, and an image 40 imaged while the workpiece 17 is being irradiated with the beam 5.

Before dot forming is started, the position of a leading end of the wire 6 is adjusted and the machining head 4 moves to a machining position so that the beam nozzle 14 and the leading end of the wire 6 are positioned coaxially. The machining position is a position at which modeling is performed. In the case illustrated in FIG. 3, feeding of the wire 6 and irradiation with the beam 5 are started in a state in which the leading end of the wire 6 is adjusted to the surface of the workpiece 17. While a melted material is applied to the workpiece 17, a state in which the melted material is in contact with the workpiece 17 is kept. In addition, the position of the leading end of the wire 6 is kept inside a spot 41. The spot 41 refers to an irradiation region of the beam 5.

Figure 5:
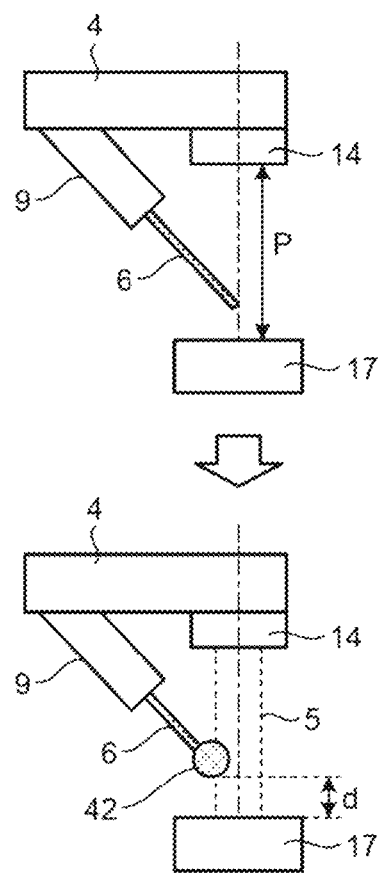
FIG. 5 is a diagram illustrating states of occurrence of a drop in modeling performed by the additive manufacturing apparatus according to the first embodiment.

Next, a case where a drop occurs will be described. FIG. 5 is a diagram illustrating states of occurrence of a drop in modeling performed by the additive manufacturing apparatus according to the first, embodiment. FIG. 6 is a diagram illustrating an example of images obtained by imaging the states of modeling illustrated in FIG. 5. FIG. 5 illustrates a state before irradiation with the beam 5 is started with the pitch P being longer than the appropriate length, and a state in which the workpiece 17 is irradiated with the beam 5 with the pitch P still being longer than the appropriate length. In FIG. 5, the machining head 4, the wire 6 fed from the wire nozzle 9 to the workpiece 17, and the workpiece 17 are illustrated, and in FIG. 6, images 40 imaged by the camera 16 are illustrated. FIG. 6 illustrates an image 40 imaged before irradiation with the beam 5 is started, and an image 40 imaged while the workpiece 17 is being irradiated with the beam 5. The surface of the workplace 17 may be lowered by being affected by heat accumulated on the workpiece 17 or the like. When the surface of the workpiece 17 is lowered, the pitch P becomes longer as illustrated in FIG. 5.

In the case illustrated in FIG. 5, in the state in which the position of the leading end of the wire 6 is adjusted and the machining head 4 is moved to a position at which modeling is to be started, the leading end of the wire 6 is separated from the surface of the workpiece 17. When feeding of the wire 6 and irradiation with the beam 5 are started in the state in which the leading end of the wire 6 is separated from the surface of the workpiece 17, the wire 6 as melted at the position at a distance d from the surface of the workpiece 17. The melted material remains at the leading end of the wire 6 without reaching the surface of the workpiece 17. The phenomenon of the material after being melted remaining at the leading end of the wire 6 before being melted produces a drop 42 at the leading end of the wire 6. The drop 42 is a spherical lump formed by the material site being melted. Part of the drop 42 is inside the spot 41. The drop 42 may also occur in a case where the output of the beam 5 is excessively high relative to the feeding speed of the wire 6.

Figure 7:
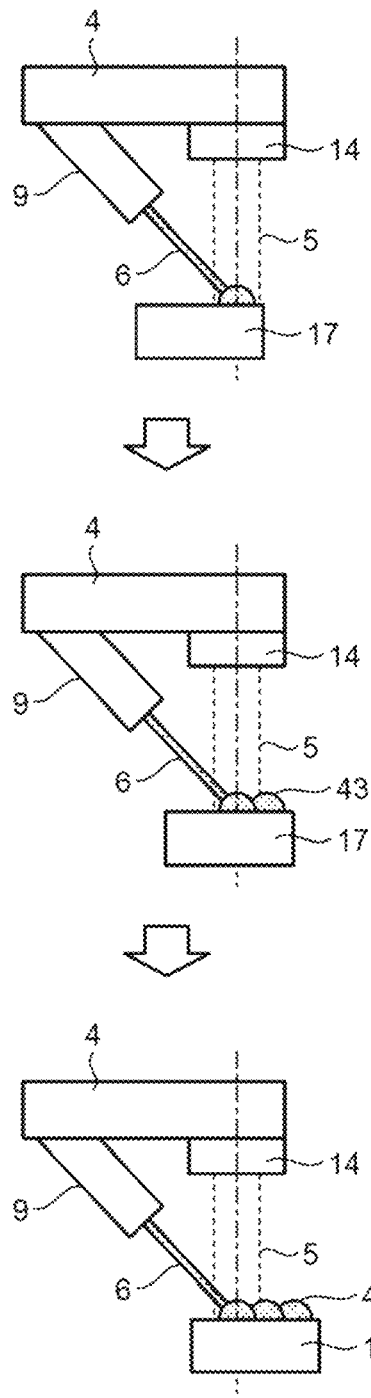
FIG. 7 is a diagram illustrating states in which modeling is continued by the additive manufacturing apparatus according to the first embodiment

FIG. 7 is a diagram illustrating states in which modeling is continued by the additive manufacturing apparatus according to the first embodiment. FIG. 7 illustrates the states in which modeling is continued with the pitch P being an appropriate length as illustrated in FIG. 3 and without occurrence of the drop 42. In this case, beads 43 of a constant size are formed with no space therebetween on the surface of the workpiece 17 by normal modeling.

FIG. 8 is a diagram illustrating states in which modeling is continued by the additive manufacturing apparatus according to the first embodiment with a drop having occurred. FIG. 8 illustrates the states of modeling in a case where the drop 42 has occurred with the pitch P being longer than the appropriate length as illustrated in FIG. 5. FIG. 8 illustrates the states in which the drop 42 has occurred after normal beads 43 are formed. At the machining position at which the drop 42 has occurred, the melted material remains on the wire 6, and thus no bead 43 is formed. At a next machining position after the machining position at which the drop 42 has occurred, the drop 42 is applied with the melted material, and a bead 44 larger than the beads 43 is formed. In a region 45 next to the bead 44, the bead 43 becomes defective. The drop 42 may fall at a position other than the machining position of the workpiece 17. As described above, as a result of formation of the drop 42, such problems as formation of an excessively large bead 44, a defective bead 43, and fall of the drop 42 at a position other than a machining position may occur. Such problems lower the product shape accuracy.

Figure 9:
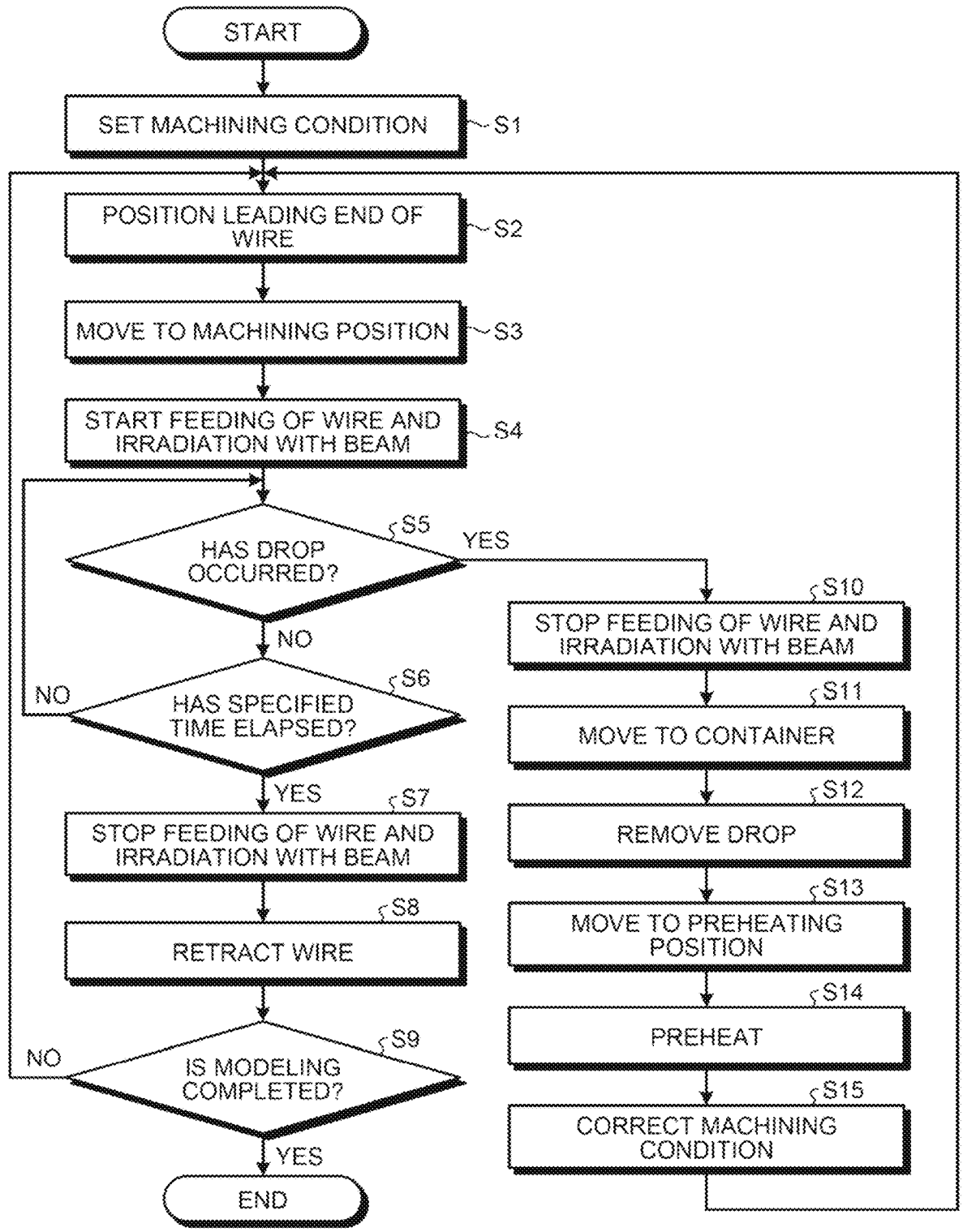
FIG. 9 is a flowchart illustrating procedures of the operation of the additive manufacturing apparatus according to the first embodiment.

Next, operation of the additive manufacturing apparatus 1 for reducing problems caused by occurrence of the drop 42 will be explained. FIG. 9 is a flowchart illustrating procedures of the operation of the additive manufacturing apparatus according to the first embodiment. In step S1, the program analyzing unit 34 sets a machining condition. The memory 33 stores setting information 39 for the machining condition such as the feeding speed of the wire 6, the output value of the beam 5, and the pitch P.

In step S2, the rotary motor 7 positions the leading end of the wire 6. Specifically, the rotary motor 7 adjusts the position of the leading end of the wire 6 so that the beam nozzle 14 and the leading end of the wire 6 are positioned coaxially. In step S3, the machining head 4 moves to the machining position. In step S4, the additive manufacturing apparatus 1 starts feeding of the wire 6 and irradiation with the beam 5. In this manner, the additive manufacturing apparatus 1 starts modeling by application of a melted material.

In step S5, the monitoring unit 36 determines whether or not the drop 42 has occurred. The monitoring unit 36 determines whether or not the drop 42 has occurred on the basis of the measured value 26, which is a result of measuring the dimension of a material after being melted remaining at the leading end of the wire 6 before being melted. A method for the determination by the monitoring unit 36 will be described later.

If it is determined by the monitoring unit 36 that no drop 42 has occurred (step S5, No), the additive manufacturing apparatus 1 determines whether or not a specified time has elapsed from the start of feeding of the wire 6 and irradiation with the beam 5 at the current machining position in step S6. The specified time refers to time during which application of a material is continued at each machining position, which is specified by the machining program 38. If the specified time has not elapsed (step S6, No), the additive manufacturing apparatus 1 returns the procedure to step S5. The additive manufacturing apparatus 1 continues application of the melted material. The monitoring unit 36 constantly monitors occurrence of the drop 42 while application of the melted material is continued.

If the specified time has elapsed (step S6, Yes), the additive manufacturing apparatus 1 stops feeding of the wire 6 and irradiation with the beam 5 in step S7. In step S8, the machining head 4 moves away from the machining position along the axial direction of the beam nozzle 14 to retract the wire 6.

In step S9, the additive manufacturing apparatus 1 determines whether or not modeling is completed. If modeling is not completed (step S9, No), the additive manufacturing apparatus 1 returns the procedure to step S2, and continues modeling. If modeling is completed (step S9, Yes), the additive manufacturing apparatus 1 terminates the operation according to the procedures illustrated in FIG. 9.

If the monitoring unit 36 has determined that the drop 42 has occurred in step S5 (step S5, Yes), the additive manufacturing apparatus 1 stops feeding of the wire 6 and irradiation with the beam 5 in step S10. In this manner, the additive manufacturing apparatus 1 interrupts modeling when the drop 42 is detected within a specified time.

Steps S11 to S15 are procedures for the recovery operation. The recovery operation is operation for returning the state of the additive manufacturing apparatus 1 to a state capable of performing normal modeling. The recovery operation includes operations for removing the drop 42. The recovery operation also includes preparation for resuming modeling. For the preparation, the additive manufacturing apparatus 1 preheats the workpiece 17 and corrects the machining condition. The preparation also includes the operations in steps S2 and S3 after removal of the drop 42.

In step S11, the machining head 4 moves to the container 19. Specifically, the machining head 4 moves to the position at which the drop 42 removed from the wire 6 before being melted is to be collected. In step S12, the additive manufacturing apparatus removes the drop 42 from the wire 6 before being melted. The additive manufacturing apparatus 1 cuts the drop 42 from the wire 6 by irradiation with the beam 5. The additive manufacturing apparatus 1 may include a cutter, which is a mechanism for cutting. The additive manufacturing apparatus 1 may cut the drop 42 from the wire 6 by using the cutter.

After removal of the drop 42, the machining head 4 moves to a preheating position in step S13. The preheating position refers to a position to be irradiated with the beam 5 during preheating in the next step S14, which is the machining position at which modeling has been interrupted or a position near the machining position at which modeling has been interrupted.

In step S14, the additive manufacturing apparatus 1 preheats the workpiece 17 by irradiating the preheating position with the beam 5. The additive manufacturing apparatus 1 includes a temperature sensor its measuring the temperature of the workpiece 17. The additive manufacturing apparatus 1 preheats workpiece 17 up to a temperature equal to the temperature of the workpiece 17 during modeling. The additive manufacturing apparatus 1 improves the wettability of the workpiece 17 by preheating the workpiece 17. The additive manufacturing apparatus 1 can reduce separation of beads 43 by improving the wettability of the workpiece 17. As a result, the additive manufacturing apparatus 1 can stably form beads 43 when modeling is resumed.

In step S15, the correction unit 37 corrects the machining condition. The correction unit 37 reduces occurrence of the drop 42 after resuming of modeling by correcting the machining condition. The correction unit 37 makes correction such as improvement in the feeding speed of the wire 6, improvement in the output of the beam 5, or decrease in the pitch P.

After step S15, the additive manufacturing apparatus 1 returns the procedure to step S2. In step S3, the machining head 4 moves to the machining position at which modeling has been interrupted. Thereafter, the additive manufacturing apparatus 1 resumes modeling by feeding of the wire 6 and irradiation with the beam 5 in step S4. By moving the machining head 4 to the machining position at which modeling has been interrupted, the additive manufacturing apparatus 1 can reduce defects of the beads 43. In addition, the additive manufacturing apparatus 1 can reduce a situation in which the bead 43 is redundantly formed on a machining position at which the bead 43 is already formed. As a result of the recovery operation of the procedures illustrated in FIG. 9, the additive manufacturing apparatus 1 can continue modeling without lowering the shape accuracy when the drop 42 has occurred at a time point before a material is applied to a machining position by dot forming.

The additive manufacturing apparatus 1 monitors occurrence of the drop 42 by the monitoring unit 36, which eliminates the need for monitoring occurrence of the drop 42 by users. This allows the additive manufacturing apparatus 1 to reduce the burden on users, and to reduce situations in which occurrence of the drop 42 is overlooked. When the drop 42 is detected, the additive manufacturing apparatus 1 automatically interrupts modeling and removes the drop 42. The additive manufacturing apparatus 1 automatically resumes modeling after removal of the drop 42. In this manner, the additive manufacturing apparatus 1 can reduce the burden on users by automatically performing the recovery operation when the drop 42 has occurred as compared with a case where a user carries out the recovery work.

Figure 10:
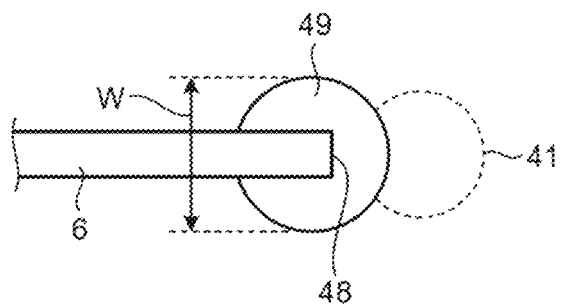
FIG. 10 is a first diagram for explaining determination performed by a monitoring unit of the additive manufacturing apparatus according to the first embodiment.

FIG. 10 is a first diagram for explaining the determination performed by the monitoring unit of the additive manufacturing apparatus according to the first embodiment. FIG. 10 illustrates a leading end 48 of the wire 6 before being melted and an area around the leading end 48. In FIG. 10, a material 49 after being melted remains at the leading end 48. The PC 27 measures the width W of the material 49 after being melted remaining at the leading end 48 of the wire 6 before being melted on the basis of the image data 25. The PC 27 outputs the measured value 26, which is a result of measuring the width W, to the NC device 10. The monitoring unit 36 compares the measured value 28 input to the input/output interface 31 with a preset threshold. When the measured value 26 is equal to or larger than the threshold, the monitoring unit 36 determines that the material 49 after being melted is the drop 42. Thus, if the measured value 26 is equal to or larger than the threshold, the monitoring unit 36 determines that the drop 42 has occurred. If the measured value 26 is smaller than the threshold, the monitoring unit 36 determines that the material 49 after being melted is not the drop 42. Thus, if the measured value 26 is smaller than the threshold, the monitoring unit 36 determines that no drop 42 has occurred.

The detecting unit for monitoring the drop 42 is not limited to the camera 16 positioned on the axis of the beam nozzle 14. The detecting unit may be located at a position other than that on the axis of the beam nozzle 14, and may be other than the camera 16.

Figure 11:
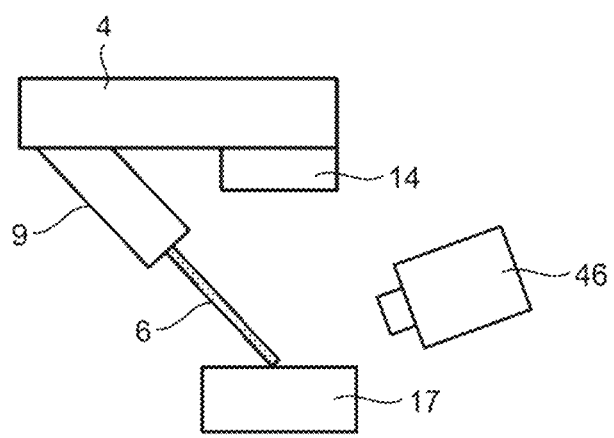
FIG. 11 is a diagram illustrating a first modification of a detecting unit of the additive manufacturing apparatus according to the first embodiment.

FIG. 11 is a diagram illustrating a first modification of the detecting unit of the additive manufacturing apparatus according to the first embodiment. A camera 46, which is the detecting unit, is positioned at an angle above the workpiece 17. In a manner similar to the camera 16, the camera 46 outputs the image data 25 to the PC 27. In this case as well, the PC 27 measures the width W of the material 49 after being melted on the basis of the image data 25.

Figure 12:
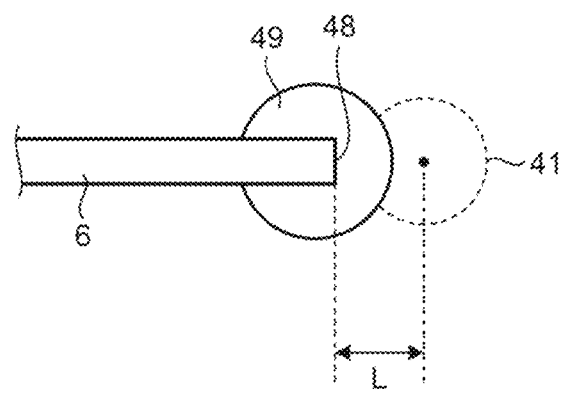
FIG. 12 is a second diagram for explaining determination performed by the monitoring unit of the additive manufacturing apparatus according to the first embodiment.

The monitoring unit 36 may determine whether or not the drop 42 has occurred on the basis of the distance between the leading end 48 of the wire 6 before being melted and the center of the beam 5. FIG. 12 is a second diagram for explaining the determination performed by the monitoring unit of the additive manufacturing apparatus according to the first embodiment. The PC 27 measures the distance L between the center of the beam 5, that is, the axis of the beam nozzle 14 and the leading end 48 of the wire 6 before being melted on the basis of the image data 25 captured by the camera 16 located inside the beam nozzle 14. The PC 27 outputs the measured value 26, which is a result of measuring the distance L, to the NC device 10. The PC 27 may measure the distance L between the leading end 48 of the wire 6 before being melted and the center of the beam 5 on the basis of the image data 25 captured by the camera 46 located at an angle above the workpiece 17. The monitoring unit 36 compares the measured value 26 input to the input/output interface 31 with a preset threshold. If the measured value 26 is equal to or larger than the threshold, the monitoring unit 36 determines that the drop 42 has occurred. If the measured value 26 is smaller than the threshold, the monitoring unit 36 determines that no drop 42 has occurred.

The detecting unit may be a device, such as a thermograph, for detecting temperature distribution. The PC 27 may determine the dimension of the material 49 after being melted remaining on the wire 6, or the distance between the leading end 48 of the wire 6 before being melted and the center of the beam 5, on the basis of the temperature distribution data.

The monitoring unit 36 may determine whether or not the drop 42 has occurred on the basis of the length of a space between the leading end 48 of the wire 6 before being melted and the workpiece 17. In this case, a camera for imaging the leading end 48 and the workpiece 17 in side view is used as the detecting unit. The PC 27 measures the length of the space on the basis of the image data 25 captured by the camera. The PC 27 outputs the measured value 26, which is a result of measuring the length, to the NC device 10. The monitoring unit 36 compares the measured value 26 input to the input/output interface 31 with a preset threshold. If the measured value 26 is equal to or larger than the threshold, the monitoring unit 36 determines that the drop 42 has occurred. If the measured value 26 is smaller than the threshold, the monitoring unit 36 determines that no drop 42 has occurred.

The monitoring unit 36 may determine whether or not the drop 42 has occurred on the basis of the presence or absence of a space between the leading end 48 of the wire 6 before being melted and the workpiece 17. In this case, a camera for imaging the leading end 48 and the workpiece 17 in side view is used as the detecting unit. The PC 27 determines whether or not a space is present on the basis of the image data 25 captured by the camera. The PC 27 outputs the result of determination of whether or not a space is present to the NC device 10. If a determination result indicating that a space is present is input to the input/output interface 31, the monitoring unit 36 determines that the drop 42 has occurred. If a determination result indicating that no space is present is input to the input/output interface 31, the monitoring unit 36 determines that no drop 42 has occurred. An electrical continuity detecting circuit may be used as the detecting unit.

Figure 13:
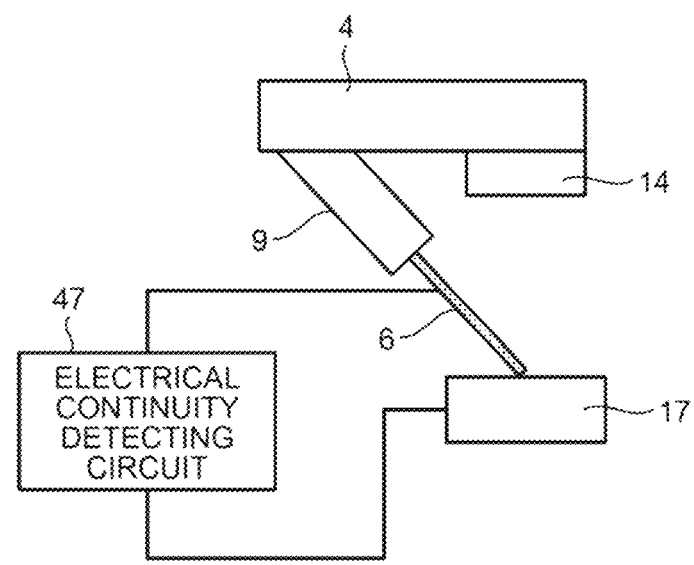
FIG. 13 is a diagram illustrating a second modification of the detecting unit of the additive manufacturing apparatus according to the first embodiment.

FIG. 13 is a diagram illustrating a second modification of the detecting unit of the additive manufacturing apparatus according to the first embodiment. An electrical continuity detecting circuit 47 is connected between the wire 6 and the workpiece 17. Voltage is applied between the wire 6 and the workpiece 17. When the leading end 48 of the wire 6 is in contact with the workpiece 17, the electrical continuity detecting circuit 47 detects electrical continuity. When the leading end 48 of the wire 6 is separated from the workpiece 17, the electrical continuity is no longer detected by the electrical continuity detecting circuit 47. The electrical continuity detecting circuit 47 outputs the result of detecting electrical continuity to the PC 27. When electrical continuity is detected by the electrical, continuity detecting circuit 47, the PC 27 determines that no space is present. When electrical continuity is not detected by the electrical continuity detecting circuit 47, the PC 27 determines that a space is present.

The monitoring unit 36 determines whether or not the drop 42 has occurred on the basis of at least one of the dimension of the material 49 after being melted remaining at the leading end 48 of the wire 6 before being melted, the distance between the leading end 48 and the center of the beam 5, and the length or the presence/absence of a space between the leading end 48 and the workpiece 17. The monitoring unit 36 may determine whether or not the drop 42 has occurred on the basis of a combination of the above.

According to the first embodiment, the additive manufacturing apparatus 1 monitors occurrence of the drop 42 by the monitoring unit 36, and removes the drop 42 that has occurred. As a result, the additive manufacturing apparatus 1 produces an effect of being capable of reducing problems caused by a phenomenon of the material after being melted remaining on the material before being melted.

Second Embodiment

In a second embodiment, a case where the drop 42 occurs while a material is applied to a machining position will be described. In the second embodiment, the additive manufacturing apparatus 1 operates in a manner similar to that in the first embodiment, and corrects the machining condition on the basis of the amount of the material applied to a machining position.

Figure 14:
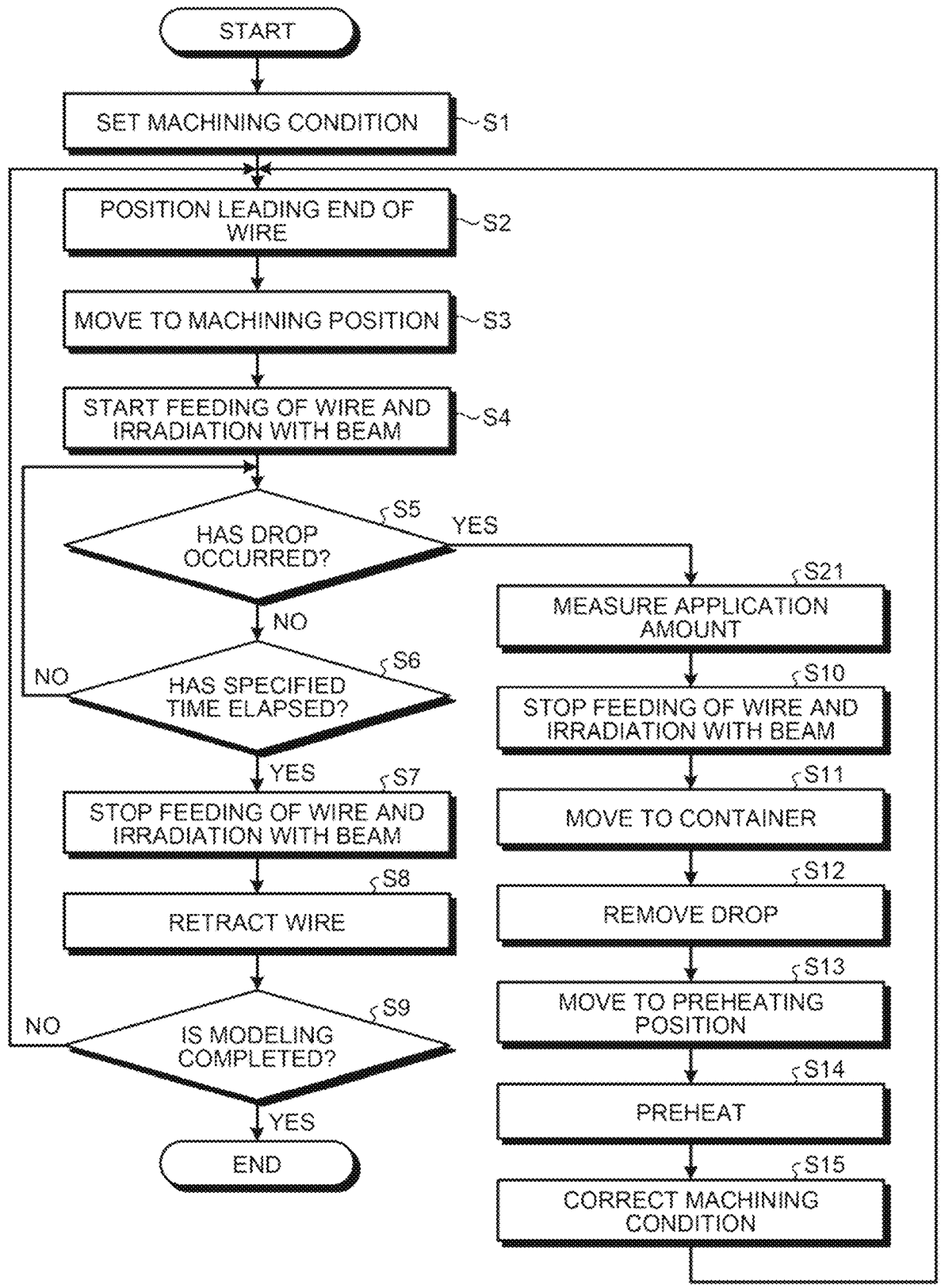
FIG. 14 is a flowchart illustrating procedures of the operation of an additive manufacturing apparatus according to a second embodiment of the present invention.

FIG. 14 is a flowchart illustrating procedures of the operation of the additive manufacturing apparatus according to the second embodiment of the present invention. The procedures in steps S1 to S9 are similar to those in FIG. 9. If the monitoring unit 36 has determined that the drop 42 has occurred in step S5 (step S5, Yes), the PC 27 measures an application amount at the current machining position in step S21. The application amount is the amount of material melted and applied to the machining position of the workpiece 17.

The additive manufacturing apparatus 1 includes a sensor for measuring the dimension or the workpiece 17. For the sensor, a contact sensor such as a touch probe or a non-contact sensor such as a laser probe is used. The sensor outputs a result of measuring the dimension to the PC 27. The PC 27 measures the application amount at occurrence of the drop 42 on the basis of the input measurement result. For the sensor, a camera may be used. The PC 27 may measure the application amount on the basis of the image data 25 obtained by imaging the machining position. The PC 27 outputs a measured value, which is a result of measuring the application amount, to the NC device 10. The measured value of the application amount is input to the input/output interface 31.

The procedures in steps S10 to S14 are similar to those in FIG. 9. In the correction of the machining condition in step S15, the correction unit 37 also performs correction based on the measured value of the application amount together with the correction for reducing occurrence of the drop 42. The correction unit 37 corrects the machining condition so that a sum of the measured application amount and the amount of material to be supplied when modeling is resumed is an amount with which a desired bead 43 can be formed.

According to the second embodiment, the additive manufacturing apparatus 1 can reduce situations in which an excessive amount of material is applied when modeling is resumed by correcting the machining condition on the basis of the result of measuring the application amount of the material. In addition, the additive manufacturing apparatus 1 can reduce situations in which the wire 6 hits the material that has been already applied to the machining position when modeling is resumed. In a case where the drop 42 has occurred while the material is applied to a machining position in dot forming, the additive manufacturing apparatus 1 can continue modeling without lowering the shape accuracy.

Third Embodiment

The additive manufacturing apparatus 1 according to a third embodiment moves the machining head 4 while performing feeding of the wire 6 and irradiation with the beam 5. Such modeling will also be referred as line forming in the description below. The additive manufacturing apparatus 1 according to the third embodiment monitors occurrence of the drop 42 and removes the drop 42 that has occurred during line forming.

Figure 15:
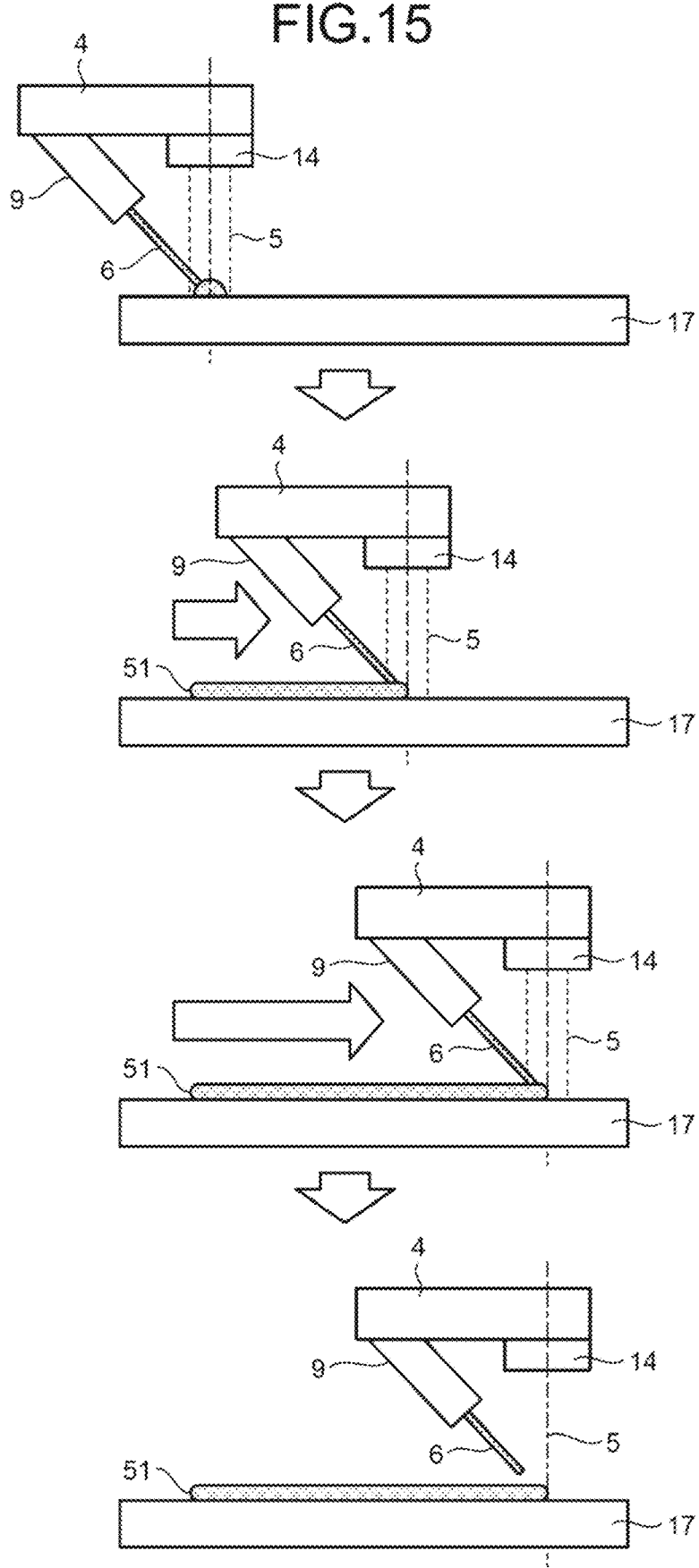
FIG. 15 is a diagram illustrating states of modeling performed by an additive manufacturing apparatus according to a third embodiment of the present invention.

FIG. 15 is a diagram illustrating states of modeling performed by the additive manufacturing apparatus according to the third embodiment of the present invention. FIG. 15 illustrates the states in which line forming is continued with the pitch P being an appropriate length in a manner similar to the case illustrated in FIG. 3 and without occurrence of the drop 42. In this case, linear beads 51 are formed on the surface of the workpiece 17 by normal line forming.

Figure 16:
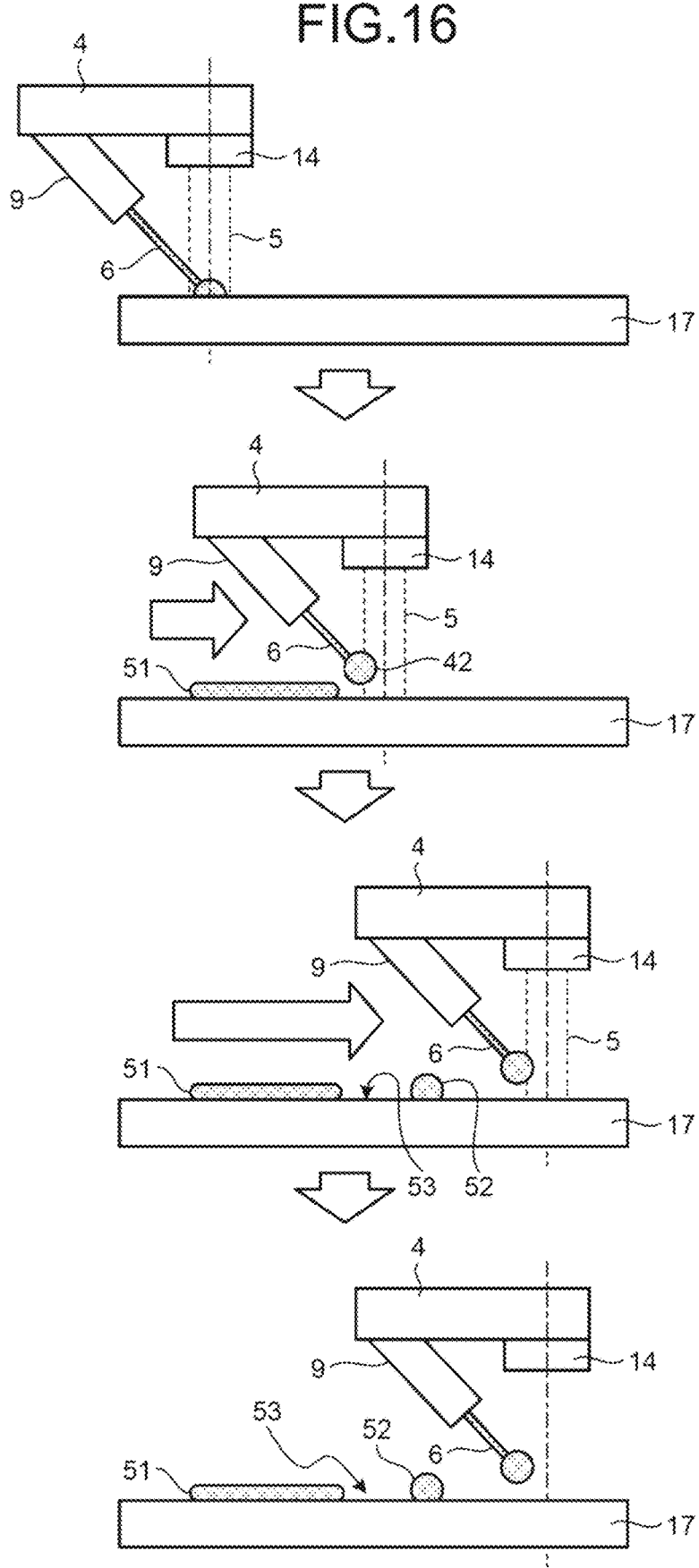
FIG. 16 is a diagram illustrating states in which modeling is continued by the additive manufacturing apparatus according to the third embodiment with a drop having occurred.

FIG. 16 is a diagram illustrating states in which modeling is continued by the additive manufacturing apparatus according to the third embodiment with a drop having occurred. FIG. 16 illustrates the states in which the drop 42 has occurred because the pitch P is longer than the appropriate length during line forming in a manner similar to the case illustrated in FIG. 5. At the machining position at which the drop 42 has occurred, the melted material remains on the wire 6, and the bead 51 thus becomes discontinuous. After occurrence of the drop 42, the machining head 4 moves, and the drop 42 may fall on the workpiece 17 under the influence of gravity. In this case, a drop 52 that has fallen is applied to the workpiece 17. The bead 51 becomes defective in a region 53 between the bead 51 and the drop 52. When the additive manufacturing apparatus 1 continues modeling with the pitch P being longer than the appropriate length, the defect of the bead 51 and the application of the drop 52 are repeated. As described above, as a result of formation of the drop 42, such problems as a defect of the bead 51 and application of the drop 52 may occur. Such problems lower the product shape accuracy.

The additive manufacturing apparatus 1 according to the third embodiment performs operation according to procedures similar to those illustrated in FIG. 9. In step S3 after the procedure is returned from step S15 to step S2, the machining head 4 moves to a position at which the bead 51 has become discontinuous. Thereafter, the additive manufacturing apparatus 1 resumes modeling by feeding of the wire 6 and irradiation with the beam 5 in step S4.

By moving the machining head 4 to the position at which the bead 51 has become discontinuous, the additive manufacturing apparatus 1 can reduce the defect of the bead 51. In addition, the additive manufacturing apparatus 1 can reduce a situation in which the bead 51 is redundantly formed on a position at which the bead 51 is already formed. In a case where the drop 42 has occurred in line forming, the additive manufacturing apparatus 1 can continue modeling without lowering the shape accuracy. Note that the additive manufacturing apparatus 1 may resume modeling at a position other than the position at which the bead 51 has become discontinuous. The additive manufacturing apparatus 1 may resume modeling from the machining position at which occurrence of the drop 42 is detected.

The additive manufacturing apparatus 1 includes a sensor for measuring the position at which the bead 51 has become discontinuous. For the sensor, a contact sensor such as a touch probe or a non-contact sensor such as a laser probe is used. For the sensor for measuring the position, a camera may be used. The PC 27 may measure the position on the basis of the image data 25 obtained by imaging the machining position. Note that the additive manufacturing apparatus 1 may perform the operation according to procedures similar to those illustrated in FIG. 14.

According to the third embodiment, the additive manufacturing apparatus 1 monitors occurrence of the drop 42 by the monitoring unit 36, and removes the drop 42 that has occurred. As a result, the additive manufacturing apparatus 1 produces an effect of being capable of reducing problems caused by a phenomenon of the material after being melted remaining on the material before being melted.

Fourth Embodiment

The additive manufacturing apparatus 1 according to a fourth embodiment monitors a sign of occurrence of the drop 42. The additive manufacturing apparatus 1 may monitor a sign in addition to monitoring of occurrence of the drop 42 and removal of the drop 42 in the first to third embodiments, or may only perform monitoring of a sign.

Figure 17:
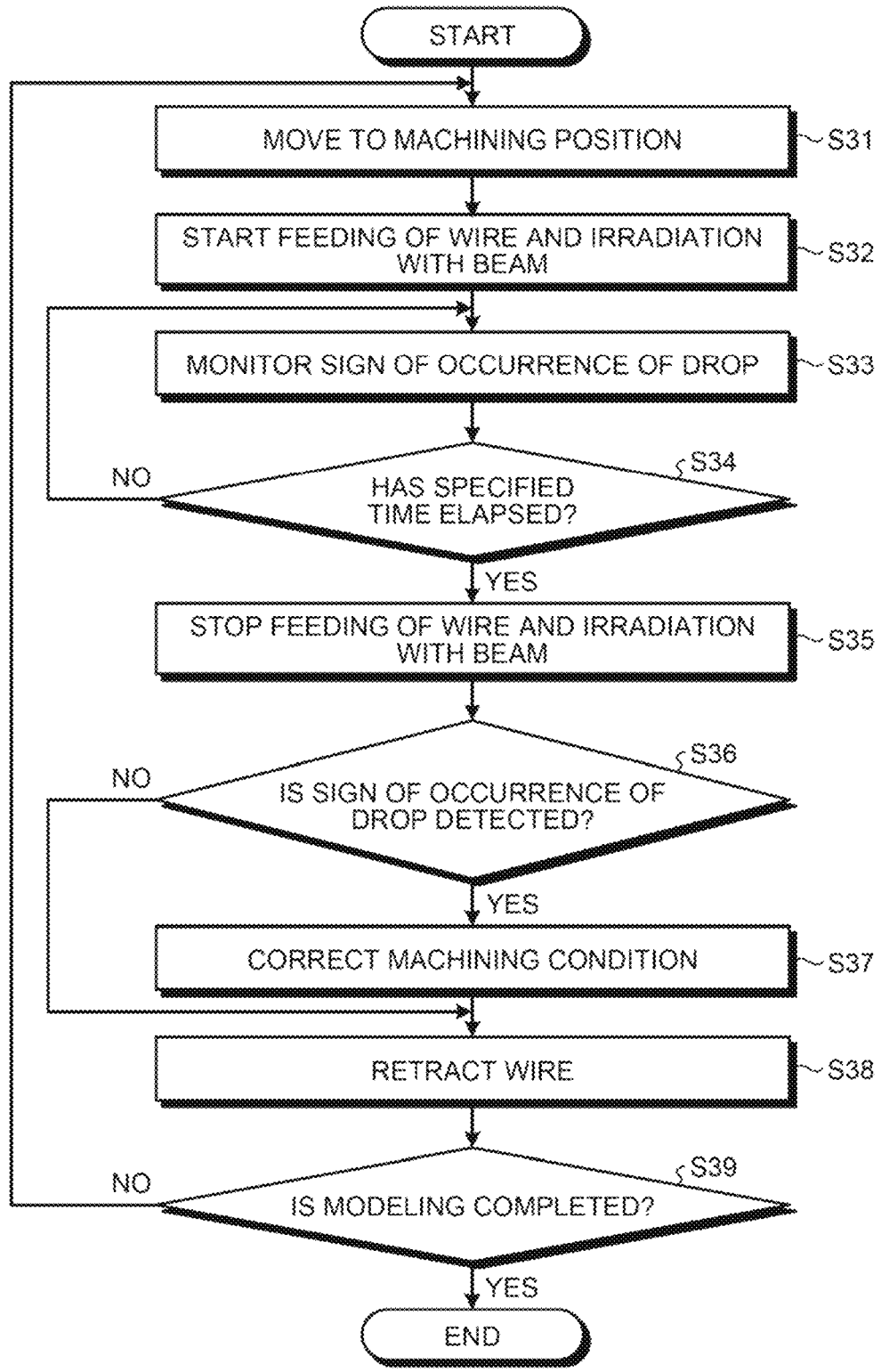
FIG. 17 is a flowchart illustrating procedures of the operation of an additive manufacturing apparatus according to a fourth embodiment of the present invention.

FIG. 17 is a flowchart illustrating procedures of the operation of the additive manufacturing apparatus according to the fourth embodiment of the present invention. In step S31, the machining head 4 moves to the machining position. In step S32, the additive manufacturing apparatus 1 starts feeding of the wire 6 and irradiation with the beam 5. In this manner, the additive manufacturing apparatus 1 starts modeling by application of a melted material.

In step S33, the monitoring unit 36 monitors a sign of occurrence of the drop 42. In step S34, the additive manufacturing apparatus 1 determines whether or not a specified time has elapsed from the start of feeding of the wire 6 and irradiation with the beam 5 at the current machining position. If the specified time has not elapsed (step S34, No), the additive manufacturing apparatus 1 returns the procedure to step S33. The additive manufacturing apparatus 1 continues application of the melted material. The monitoring unit 36 constantly monitors a sign of occurrence of the drop 42 while application of the melted material is continued. A method for detecting a sign of occurrence of the drop 42 by the monitoring unit 36 will be described later.

If the specified time has elapsed (step S34, Yes), the additive manufacturing apparatus 1 stops feeding of the wire 6 and irradiation with the beam 5 in step S35. In step S36, the monitoring unit 36 determines whether or not a sign of occurrence of the drop 42 is detected. If the monitoring unit 36 has detected a sign of occurrence of the drop 42 (step S36, Yes), the correction unit 37 corrects the machining condition in step S37. The correction unit 37 reduces occurrence of the drop 42 by correcting the machining condition. The correction unit 37 makes correction such as improvement in the feeding speed of the wire 6, improvement in the output of the beam 5, or decrease in the pitch P.

After the correction in step S37, the additive manufacturing apparatus 1 proceeds the procedure to step S38. If the monitoring unit 36 has not detected a sign of occurrence of the drop 42 (step S36, No), the additive manufacturing apparatus 1 skips step S37, and proceeds the procedure to step S38.

In step S38, the machining head 4 moves away from the machining position along the axial direction of the beam nozzle 14 to retract the wire 6. In step S39, the additive manufacturing apparatus 1 determines whether or not modeling is completed. If modeling is net completed (step S39, No), the additive manufacturing apparatus 1 returns the procedure to step S31, and continues modeling. If modeling is completed (step S39, Yes), the additive manufacturing apparatus 1 terminates the operation according to the procedures illustrated in FIG. 17.

In a manner similar to the case illustrated in FIG. 10, the PC 27 measures the width W of the material 49 after being melted remaining at the leading end 48 of the wire 6 before being melted on the basis of the image data 25. The PC 27 outputs the measured value 26, which is a result of measuring the width W, to the NC device 10. The monitoring unit 36 compares the measured value 26 input to the input/output interface 31 with a preset threshold for sign detection. The threshold for sign detection, which is a second threshold, is smaller than the first threshold, which is a threshold for determining whether or not the drop 42 has occurred in the first embodiment. A value indicating the width W in a case where normal modeling is performed without occurrence of the drop 42 and the possibility of occurrence of the drop 42 from now is determined to be high is adopted as the threshold for sign detection. If the measured value 26 is equal to or larger than the threshold for sign detection, the monitoring unit 36 detects a sign of occurrence of the drop 42. If the measured value 26 is smaller than the threshold for sign detection, the monitoring unit 36 determines that there is no sign of occurrence of the drop 42.

A detecting unit for monitoring a sign of occurrence of the drop 42 is similar to the detecting unit in the first to third embodiments, which is a detecting unit for monitoring occurrence of the drop 42. In addition, in a manner similar to the case illustrated in FIG. 12, the monitoring unit 36 may detect a sign of occurrence of the drop 42 on the basis of the distance L between the leading end 48 of the wire 6 before being melted and the center of the beam 5. The PC 27 outputs the measured value 26, which is a result of measuring the distance L, to the NC device 10. The monitoring unit 36 compares the measured value 26 with a preset threshold for sign detection. If the measured value 26 is equal to or larger than the threshold for sign detection, the monitoring unit 36 detects a sign of occurrence of the drop 42. If the measured value 26 is smaller than the threshold for sign detection, the monitoring unit 36 determines that there is no sign of occurrence of the drop 42.

Note that the correction of the machining condition by the correction unit 37 may be carried out at any timing. In the case of dot forming, the correction unit 37 can correct the machining condition between timings at which beads 43 are formed. In the case of line forming, the correction unit 37 can correct the machining condition between timings at which the beads 51 are formed. Note that, in a case where a sign of occurrence of the drop 42 is detected in line forming, the correction unit 37 may correct the machining condition while the bead 51 is formed.

According to the fourth embodiment, the additive manufacturing apparatus 1 monitors a sign of occurrence of the drop 42 by the monitoring unit 36, and corrects the machining condition when a sign is detected. The additive manufacturing apparatus 1 can prevent the drop 42 from occurring. As a result, the additive manufacturing apparatus 1 produces an effect of being capable of reducing problems caused by a phenomenon of the material after being melted remaining on the material before being melted.

The configurations presented in the embodiments above are examples of the present invention, and can be combined with other known technologies or can be partly omitted or modified without departing from the scope of the present invention.

REFERENCE SIGNS LIST 1 additive manufacturing apparatus; 2 laser oscillator; 3 fiber cable; 4 machining head; 5 beam; 6 wire; 7 rotary motor; 8 wire spool; 9 wire nozzle; 10 NC device; 11 head driving unit; 12 gas supplying device; 13 gas; 14 beam nozzle; 15 piping; 16, 46 camera; 17 workpiece; 18 stage; 19 container; 20 modeling unit; 21 axis command; 22 laser output command; 23 feed command; 24 gas supply command; 25 image data; 26 measured value; 27 PC 31 input/output interface; 32 processor; 33 memory; 34 program analyzing unit; 35 command generating unit; 36 monitoring unit; 37 correction unit; 38 machining program; 39 setting information; 40 image; 41 spot; 42, 52 drop; 43, 44, 51 bead; 45, 53 region; 47 electrical continuity detecting circuit; 48 leading end; 49 material after being melted.

The invention claimed is:

1. An additive manufacturing apparatus comprising:
a modeler to perform modeling by applying a material in melted form to a workpiece; and
a monitoring circuitry to monitor occurrence of a drop caused by the material after being melted and remaining at a leading end of the material but before being melted to the workpiece, wherein
when the drop remaining at the leading end of the material has occurred after the modeling is started and before the modeling is completed, the modeler interrupts the modeling, removes the drop from the leading end of the material, and resumes the modeling to be completed without the drop at the leading end of the material, and
the monitoring circuitry determines whether or not the drop has occurred based on a dimension of the material after being melted remaining at the leading end of the material but before being melted to the workpiece.

2. The additive manufacturing apparatus according to claim 1, wherein the modeler resumes the modeling after preheating the workpiece.

3. The additive manufacturing apparatus according to claim 1, wherein the modeler resumes the modeling from an end position of a bead formed on the workpiece.

4. The additive manufacturing apparatus according to claim 1, wherein
the modeler includes a machining head to move a first position to which the material is to be fed, and
when the drop is detected, the machining head moves to a second position at which the drop removed from the material before being melted is to be collected.

5. An additive manufacturing system comprising:
a modeler to perform modeling by applying a material in melted form to a workpiece, and
circuitry configured to monitor occurrence of a drop caused by the material after being melted and remaining at a leading end of the material but before being melted to the workpiece, wherein
when the drop remaining at the leading end of the material has occurred after the modeling is started and before the modeling is completed, the circuitry interrupts the modeling, removes the drop from the leading end of the material, and resumes the modeling to be completed without the drop at the leading end of the material, and
the circuitry determines whether or not the drop has occurred based on a dimension of the material after being melted remaining at the leading end of the material but before being melted to the workpiece.

6. The additive manufacturing system according to claim 5, wherein the circuitry resumes the modeling after preheating the workpiece.

7. The additive manufacturing system according to claim 5, wherein the circuitry resumes the modeling from an end position of a bead formed on the workpiece.

8. The additive manufacturing system according to claim 5, wherein
the modeler includes a machining head to move a first position to which the material is to be fed, and
when the drop is detected, the machining head moves to a second position at which the drop removed from the material before being melted is to be collected.

9. An additive manufacturing apparatus comprising:
modeling means for performing modeling by applying a material in melted form to a workpiece; and
monitoring means for monitoring occurrence of a drop caused by the material after being melted and remaining at a leading end of the material but before being melted to the workpiece, wherein
when the drop remaining at the leading end of the material has occurred after the modeling is started and before the modeling is completed, the modeling means interrupts the modeling, removes the drop from the leading end of the material, and resumes the modeling to be completed without the drop at the leading end of the material, and the monitoring means determines whether or not the drop has occurred based on a dimension of the material after being melted remaining at the leading end of the material but before being melted to the workpiece.

10. The additive manufacturing apparatus according to claim 9, wherein the modeling means resumes the modeling after preheating the workpiece.

11. The additive manufacturing apparatus according to claim 9, wherein the modeling means resumes the modeling from an end position of a bead formed on the workpiece.

12. The additive manufacturing apparatus according to claim 9, wherein the modeling means includes a machining head to move a first position to which the material is to be fed, and when the drop is detected, the machining head moves to a second position at which the drop removed from the material before being melted is to be collected.

* * * * *